United States Patent
Takagi et al.

[11] Patent Number: 5,520,716
[45] Date of Patent: May 28, 1996

[54] AL₂O₃-TIC SINTERED PRODUCT AND SUBSTRATE FOR MAGNETIC HEADS

[75] Inventors: Nobuoki Takagi; Hiroki Tokunaga; Shinichiro Masuyama, all of Kokubu, Japan

[73] Assignee: Kyocera Corporation, Kyoto, Japan

[21] Appl. No.: 397,579

[22] Filed: Mar. 2, 1995

[30] Foreign Application Priority Data

Mar. 3, 1994 [JP] Japan .................................. 6-033512

[51] Int. Cl.⁶ .................................................. B22F 7/00
[52] U.S. Cl. ............................... 75/235; 75/233; 75/236; 75/237; 29/603.27; 501/87; 501/127; 501/153
[58] Field of Search .......................... 75/233, 235, 236, 75/237; 29/603; 501/87, 127, 153

[56] References Cited

U.S. PATENT DOCUMENTS

| | | | |
|---|---|---|---|
| 4,582,812 | 4/1986 | Furukawa et al. | 501/87 |
| 4,818,608 | 4/1989 | Furuyama et al. | 428/327 |
| 4,902,651 | 2/1990 | Wada et al. | 501/87 |
| 5,141,901 | 8/1992 | Brandt | 501/87 |
| 5,188,908 | 2/1993 | Nishiyama et al. | 428/698 |
| 5,246,893 | 9/1993 | Takagi et al. | 501/87 |
| 5,322,823 | 6/1994 | Ueda et al. | 501/89 |

*Primary Examiner*—Donald P. Walsh
*Assistant Examiner*—Scott T. Bluni
*Attorney, Agent, or Firm*—Loeb & Loeb

[57] ABSTRACT

An Al₂O₃-TiC sintered product comprising $Al_2O_3$ as a main component and containing TiC in an amount of from 20 to 40% by weight, wherein the average particle diameter of $Al_2O_3$ particles in the sintered product is larger by 5 to 50% than the average particle diameter of TiC particles, the average particle diameter of the sintered product as a whole is not larger than 1 μm, the average particle diameter of TiC particles is not larger than 0.9 μm, and the total amount of the grain boundary phases other than $Al_2O_3$ and TiC is not larger than 1.0% by weight. The $Al_2O_3$-TiC sintered product can be used as a substrate 1 for a magnetic head, and has portions such as grooves 4 and stepped portions formed in the surface of the air bearing surface 2 of the slider by being irradiated with ions. The sintered product exhibits excellent surface quality after machined by being irradiated with ions and can be machined at an increased rate. Hence, the air bearing surface of the slider such as of a thin-film head can be finely machined maintaining excellent precision making it possible to enhance reliability of the magnetic head.

6 Claims, 1 Drawing Sheet

5,520,716

AL₂O₃-TIC SINTERED PRODUCT AND SUBSTRATE FOR MAGNETIC HEADS

BACKGROUND OF THE INVENTION (1) Field of the Invention

The present invention relates to an $Al_2O_3$-TiC sintered product adapted to being machined on its surfaces by the irradiation with ions such as of ion milling method or reactive ion etching method (REI method). More specifically, the invention relates to an $Al_2O_3$-TiC sintered product that is used as a substrate for thin-film magnetic heads, and is further used for jigs and measuring instruments.

(2) Description of the Prior Art

Among the magnetic heads, a thin-film magnetic head forms a magnetic head circuit on the surface of a predetermined substrate relying on a thin-film-forming method such as sputtering or the like, and has been vigorously developed since it enables the magnetic gap to be finely controlled as well as a high-density recording to be accomplished. In the substrate used for the thin-film magnetic head, the surface that faces the magnetic recording medium works as an air bearing surface of a slider and has, hence, been machined in a variety of ways such as being provided with grooves or stepped portions.

In most cases, so far, the surfaces of the substrates have been mechanically machined. Therefore, the substrates must satisfy the requirements of excellent wear resistance, specular machining property, chipping resistance during the slicing and machinability.

As a material for satisfying such requirements, there has been much used an $Al_2O_3$-TiC sintered products obtained by adding TiC to $Al_2O_3$. In order to satisfy the above-mentioned properties, sintering assistants such as MgO and $Y_2O_3$ are further added to the $Al_2O_3$ sintered product to obtain a perfectly densely sintered product which exhibits improved specular machinability, or crystalline grains of the sintered product are grown to about 1.5 to about 3 μm to improve chipping resistance during the slicing and to improve machinability.

In recent years, the floating amount of the magnetic head on the magnetic recording medium is further decreasing accompanying an increase in the density of magnetic recording. This has caused the air bearing surface of the slider to be machined requiring high dimensional precision, such as surface flatness, surface coarseness, crown, camber, blending, etc. A representative example may be a TPC (transverse pressurization contour) slider and and MR slider. The conventional machining technology, however, is not capable of satisfying these requirements to a sufficient degree and, hence, a so-called ion milling method or an RIE method has been studied to execute the machining while irradiating the specular surface to be machined with ions of Ar, $CF_4$, $CCl_4$, $BCl_3$, etc.

With the conventional $Al_2O_3$-TiC sintered product, however, the crystalline particle diameter is relatively large, i.e., from about 1.5 to about 3 μm in an average particle diameter, and, hence, the sintered product is machined (etched or milled) at a small rate. Besides, the $Al_2O_3$ and TiC particles are machined at different rate, and the surfaces after machined become far from of satisfactory quality.

From the standpoint of obtaining a perfectly dense product, furthermore, the conventional sintered product contains sintering assistants in amounts of several percent. Accordingly, sintering assistants, compound phase of sintering assistants and $Al_2O_3$, and glass phase much exist on the grain boundaries of $Al_2O_3$ and TiC in the sintered product. When the ion milling or the RIE machining is carried out, therefore, the grain boundary phase is preferentially etched since the compound phase and the glass phase existing in the grain boundaries are etched at very larger rates than TiC and $Al_2O_3$. When the compound phase and the glass phase are poorly dispersed, furthermore, large dents are formed, causing the surface quality to be deteriorated after the machining.

The present inventors have forwarded the study in view of the above-mentioned problems, have discovered the fact that the sintered product can be machined at an increased rate when it is subjected to the ion milling or to the RIE machining, and the surface quality after the machining can be greatly improved compared with the conventional sintered products when the crystalline particle diameters of $Al_2O_3$ and TiC in the sintered product are so controlled that the particle diameter of $Al_2O_3$ is relatively larger than that of TiC, and when the particle diameters as a whole are selected to be small, and have arrived at the present invention.

SUMMARY OF THE INVENTION

It is therefore an object of the present invention to provide an $Al_2O_3$-TiC sintered product which exhibits excellent surface quality after the machining and can be machined at an increased rate by being irradiated with ions such as of ion milling or RIE machining. Another object of the present invention is to provide a substrate for thin-film magnetic heads which is very finely machined by ion milling or RIE machining and is suited for a TPC slider or an MR slider.

According to the present invention, there is provided an $Al_2O_3$-TiC sintered product comprising $Al_2O_3$ as a main component and containing TiC in an amount of from 20 to 40% by weight, the average particle diameter of $Al_2O_3$ particles in the sintered product being larger by 5 to 50% than the average particle diameter of TiC particles.

In the $Al_2O_3$-TiC sintered product, furthermore, the average particle size of the sintered product as a whole is not larger than 1 μm and the average particle diameter of TiC is not larger than 0.9 μm, in addition to the above-mentioned features.

The invention further provides the $Al_2O_3$-TiC sintered product in which the amount of the grain boundary phase exists in an amount of not larger than 1.0% by weight in the grain boundaries of the particles.

According to the present invention, furthermore, the $Al_2O_3$-TiC sintered product is used as a substrate for magnetic heads.

Moreover, the substrate for magnetic heads has portions that are machined by being irradiated with ions.

PREFERRED EMBODIMENT OF THE INVENTION

Figure 1:
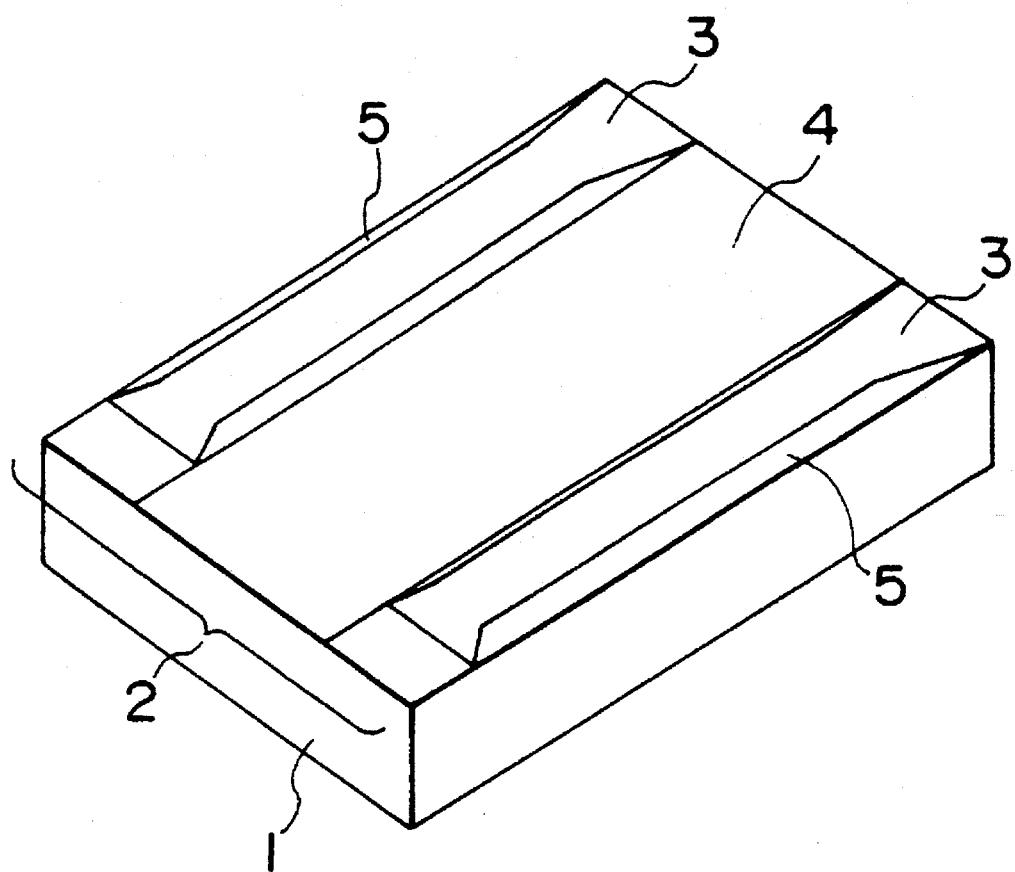
FIG. 1 is a diagram illustrating a TPC slider of a magnetic head by using a sintered product of the present invention as a substrate.

The $Al_2O_3$-TiC sintered product of the present invention comprises $Al_2O_3$ as a main component and contains TiC in an amount of from 20 to 40% by weight. The amount of TiC is limited within the above-mentioned range because of the reason that when the amount of TiC is less than 20% by weight, the chipping resistance is deteriorated and when the amount of TiC is more than 40% by weight, on the other hand, the rate of machining by the irradiation with ions becomes small which is disadvantageous in economy though the surface quality is improved. It is desired that the amount of TiC is from 25 to 35% by weight and, particularly, from 27 to 33% by weight.

The sintered product having the above-mentioned composition is constituted by $Al_2O_3$ granular particles, TiC granular particles and grain boundary phases. According to the present invention, what is important is that the $Al_2O_3$ particles have an average particle diameter which is larger than the average particle diameter of TiC particles, and that the average particle diameter of $Al_2O_3$ particles is larger than the average particle diameter of TiC particles by 5 to 50% and, particularly, by 20 to 40%. This relative difference in the particle diameter greatly affects the machinability of the sintered product by irradiation with ions. When the particle diameter of the $Al_2O_3$ particles is nearly the same as, or is smaller than, that of the TiC particles or when the particle diameter of the $Al_2O_3$ particles is larger than that of the TiC particles by less than 5%, the sintered product loses smoothness on the surface after machined with ions and is machined at a decreased rate. When the particle diameter of the $Al_2O_3$ particles is larger than that of the TiC particles by more than 50%, on the other hand, the TiC particles are machined at a rate larger than a rate at which the $Al_2O_3$ particles are machined and, hence, smoothness is deteriorated though the machining rate increases.

It is further desired that the $Al_2O_3$ particles and the TiC particles in the sintered product have a whole average particle size of not larger than 1.0 μm and, particularly, not larger than 0.76 μm and that the TiC particles have an average particle diameter of not larger than 0.9 μm and, particularly, not larger than 0.65 μ. This is because when the particle diameter becomes larger than the above-mentioned range, the machining rate becomes small, the machining is accomplished requiring extended periods of time, and the surface quality is deteriorated, too.

In the $Al_2O_3$-TiC sintered product, furthermore, a variety of metal oxides are added as sintering assistants in order to enhance the sintering property. However, the sintering assistants that are added undergo reaction with the $Al_2O_3$ during the step of sintering to form a compound phase or a grain boundary phase which is a glass phase different from the $Al_2O_3$ particles and the TiC particles. For instance, when MgO is added, there are formed such compounds as $Al_2O_3$ and spinel. Such a compound phase and a glass phase are machined at very small rates, and the surface quality after the machining is deteriorated. When the sintering assistants are added, therefore, it is desired that the total amount of the compound phase or the grain boundary phase of glass phase formed by the addition of the sintering assistants is not larger than 1% by weight, and particularly, not larger than 0.7% by weight, and more particularly, not larger than 0.3% by weight with respect to the total amount. Examples of the sintering assistant include MgO, $Y_2O_3$, CaO, $Yb_2O_3$ and $SiO_2$. Among them, MgO gives the worst effect.

The above-mentioned $Al_2O_3$-TiC sintered product of the present invention is obtained by adding an $Al_2O_3$ powder and a TiC powder as well as a predetermined sintering assistant at the above-mentioned predetermined ratio, mixing and pulverizing them together by any mixing method such as by using a ball mill, followed by molding, and then firing the molded article by the hot-press method or the hot isostatic pressure firing method (HIP method) at a temperature of from 1500° to 1650° C. As described earlier, the particle diameters of the $Al_2O_3$ particles and of the TiC particles are controlled by using the starting materials having small particle diameters and, particularly, by so selecting the $Al_2O_3$ powder as to have a size larger than that of the TiC particles and, further, by setting the firing temperature to be low as much as possible.

To machine the $Al_2O_3$-TiC sintered product of the present invention by the irradiation with ions such as of ion milling or RIE method, the sintered product to be machined is placed as a cathode in a sputtering apparatus in vacuum of $10^{-5}$ Torr, and is irradiated with ions of an inert gas such as $Ar^+$ ions or with ions of a reactive gas such as $CF_4$, $CCl_4$ or $BCl_4$ which are accelerated at a beam voltage of from 600 to 1000V. Thus, the surface of the sintered product is machined by etching.

Through the above-mentioned machining, the air bearing surface of the slider that faces the magnetic recording surface of the thin-film magnetic head can be machined very precisely. FIG. 1 illustrates a TPC slider in which a pair of rails 3 and a groove 4 are formed on the air bearing surface 2 of the slider of a substrate 1, and stepped portions 5 are formed on the outer sides of the rails 3, the stepped portions having a depth of from 0.5 to 1 μm and, particularly, from 0.7 to 0.9 μm.

The stepped portions 5 are formed in the air bearing surface by applying a photomask of resist pattern composed of a resin or the like onto the surface of the substrate of the $Al_2O_3$-TiC substrate except the portions that are to be machined, and bombarding ions to machine the portions without the resist by etching. The resist is then removed.

The machining based on the ion milling or the RIE method is effective in machining precision jigs, measuring instruments and a variety of precision parts in addition to machining the stepped portions of the TPC slider.

Of the $Al_2O_3$ particles and the TiC particles constituting the $Al_2O_3$-TiC sintered product of the present invention, the $Al_2O_3$ particles are machined (by milling or etching) by the irradiation with ions at an increased rate. Therefore, when the $Al_2O_3$ particles and the TiC particles have nearly the same particle diameter, the $Al_2O_3$ particles are etched excessively and, hence, the surface quality is deteriorated after the machining.

According to the present invention, on the other hand, the particle size of the $Al_2O_3$ particles is set to be larger than the particle size of the TiC particles by 5% to 50%, so that the machining rate for the $Al_2O_3$ particles and the machining rate for the TiC particles are brought into match with each other. Since there is no difference in the machining rate, the surface does not become rugged after the machining and there is obtained a machined surface having excellent smoothness.

According to the present invention, furthermore, the metal compounds that serve as sintering assistants are added in small amounts in addition to $Al_2O_3$ and TiC. Accordingly, ruggedness is formed little on the machined surface despite the grain components are etched, and there is obtained a surface of high quality.

When the sintered product is used as a slider of the thin-film magnetic head, e.g., is machined as a TPC slider by being irradiated with ions, therefore, improved surface quality is obtained after the machining and the magnetic head exhibits improved reliability.

EXAMPLES (Example 1)

The starting powder of $Al_2O_3$ (purity of 99.9% or higher) and TiC (purity of 99.5% or higher) were weighed in a manner that $Al_2O_3$ was 70% by weight and TiC was 30% by weight, and $TiO_2$ was added thereto in an amount of about 10% by weight with respect to TiC, which were then mixed together using by means of ball mil using $Al_2O_3$ balls. The mixture powder was then molded and was fired by the hot press at 1600° C. under a pressure of 250 kg/cm² for one hour. In the experiments, the starting powders of $Al_2O_3$ having average particle diameters of from 0.4 to 2.7 μm and TiC powders having average diameters of 0.3 to 3.0 μm were used to prepare several kinds of sintered products having $Al_2O_3$ particles and TiC particles of different diameters in the final sintered products.

After specularly machined, the sintered products were measured for their particle diameters and the amounts of grain boundary phases made up of a compound phase and a glass phase. As for the average particle diameter of the TiC particles, the diameter corresponding to a circle was calculated relying upon the image processing using LUZEX 500. The average particle diameter of the whole particles was measured relying upon the CODE method after the fire-etching. Moreover, the average particle diameter of $Al_2O_3$ was calculated from the average particle diameter of the TiC and whole particles and from the volume ratio of TiC to $Al_2O_3$. Furthermore, the compound phase was found by the X-ray diffraction quantitative method, and the amount of the glass phase was calculated from the amount of the additives and the amount of the compounds, and their resultant amount was found as the amount of the grain boundary phases. The results were as shown in Table 1. The amounts of the grain boundary phases of the compound phase and the glass phase were not both larger than 0.1% by weight of the sintered product.

The sintered product was held in vacuum of $5.2 \times 10^{-4}$ Torr and its surface was etched up to a depth of 1.5 μ with an argon beam of 800 V, 200 mA. After the machining, the coarseness (Rmax) on the surface was measured. At this moment, the rate of etching was calculated from the machining time.

As for the chipping resistance of the sintered product, the sintered product was cut by revolving a diamond wheel (resin #325, 110 mm in diameter×1 mm in thickness) at a speed of 5500 rpm and feeding it at a rate of 40 mm/min, and the chipping was evaluated from the cut surface thereof. That is, the chipping was evaluated by selecting any two points which are spaced apart by 500 μm on the cut surface, selecting five points having the greatest chipping width therebetween, and finding an average chipping width. The chipping resistance was evaluated to be good when the average chipping width was less than 25 μ, fair when the average chipping width was from 25 to 30 μm, and bad when the average chipping width was more than 80 μm.

TABLE 1

| Sample No. | Average particle diameter (μm) | | | | Machining rate (Å/min) | Surface quality (μm) | Chipping resistance |
|---|---|---|---|---|---|---|---|
| | $Al_2O_3$ | TiC | $Al_2O_3$/TiC | whole | | | |
| *1 | 1.4 | 1.8 | 0.78 | 1.50 | 118 | 0.38 | good |
| *2 | 3.0 | 3.4 | 0.88 | 3.10 | 108 | 0.56 | good |
| *3 | 2.1 | 2.1 | 1.00 | 2.10 | 113 | 0.41 | good |
| *4 | 1.0 | 0.97 | 1.03 | 0.99 | 130 | 0.36 | good |
| 5 | 0.94 | 0.89 | 1.05 | 0.93 | 135 | 0.29 | good |
| 6 | 1.0 | 0.89 | 1.12 | 0.97 | 138 | 0.29 | good |
| 7 | 0.78 | 0.65 | 1.20 | 0.75 | 142 | 0.25 | good |
| 8 | 0.54 | 0.43 | 1.26 | 0.51 | 152 | 0.20 | good |
| 9 | 1.4 | 1.13 | 1.27 | 1.35 | 130 | 0.30 | good |
| 10 | 0.73 | 0.51 | 1.43 | 0.67 | 144 | 0.23 | good |
| 11 | 0.75 | 0.50 | 1.50 | 0.69 | 144 | 0.24 | good |
| *12 | 0.90 | 0.50 | 1.80 | 0.80 | 135 | 0.38 | good |

Samples marked with * lie outside the scope of the invention.

According to Table 1, in the case of samples Nos. 1 to 4 in which the $Al_2O_3$ particles were smaller than the TiC particles, or were nearly the same, or were larger than the TiC particles by less than 5%, the surface coarsenesses were large and the surface qualities were of low levels. In samples Nos. 5 to 11 in which the $Al_2O_3$ particles were larger than TiC particles by 5 to 50%, on the other hand, the surface coarsenesses after the machining were all not larger than 0.3 μm and the surface qualities were high.

It will further be learned that the machining rate decreases with an increase in the particle diameter and that the machining rate of not smaller than 130 ∪/min is accomplished when the particle diameter of TiC is not larger than 0.9 μm.

(Example 2)

A starting powder of $Al_2O_3$ (purity of 99.9% or higher) having an average particle diameter of 0.6 μm and a starting powder pf TiC (purity of 99.5% or higher) having an average particle diameter of 0.65 μwere weighed and mixed together at blending ratios shown in Table 2, and were treated in the same manner as in Example 1 to obtain sintered products.

The sintered products were measured for their amounts of grain boundary phases, average particle diameters, surface qualities after machining, machining rates and chipping resistances in the same manner as Example 1. The amounts of grain boundary phases were 0.1% by weight in all samples. Other properties were as shown in Table 2.

TABLE 2

| Sample No. | Composition (% by weight) | | Average particle diameter (μm) | | | | Machining rate (Å/min) | Surface quality (μm) | Chipping resistance |
|---|---|---|---|---|---|---|---|---|---|
| | $Al_2O_3$ | TiC | $Al_2O_3$ | TiC | $Al_2O_3$/TiC | whole | | | |
| *13 | 58 | 42 | 0.80 | 0.65 | 1.23 | 0.74 | 121 | 0.23 | fair |
| 14 | 65 | 35 | 0.79 | 0.64 | 1.23 | 0.74 | 130 | 0.23 | good |
| 15 | 67 | 33 | 0.77 | 0.64 | 1.20 | 0.73 | 140 | 0.24 | good |
| 16 | 74 | 26 | 0.78 | 0.65 | 1.20 | 0.75 | 144 | 0.26 | good |
| 17 | 77 | 23 | 0.77 | 0.65 | 1.18 | 0.75 | 147 | 0.30 | fair |
| *18 | 82 | 18 | 0.76 | 0.64 | 1.19 | 0.74 | 150 | 0.38 | bad |
| *19 | 90 | 10 | 0.75 | 0.65 | 1.15 | 0.74 | 156 | 0.42 | bad |

Samples marked with * lie outside the scope of the invention.

As will be obvious from Table 2, the etching rate decreases when the amount of TiC exceeds 40% by weight. The samples Nos. 18 and 19 containing TiC in amounts of less than 20% by weight exhibited poor chipping resistance. All other products of the present invention exhibited machining rates of not smaller than 130 Å/min. Among them, the products containing TiC in amounts of from 25 to 35% by weight exhibited favorable chipping resistance, as well.

(Example 3)

A starting powder of $Al_2O_3$ (purity of 99.9% or higher) having an average particle diameter of 0.6 μ, a starting powder of TiC (purity of 99.5% or higher) having an average particle diameter of 0.65 μm and MgO powder (purity of 99.9% or higher) were weighed and mixed together at blending ratios shown in Table 3, and were treated in the same manner as in Example 1 to obtain sintered products.

The sintered products were measured for their amounts of grain boundary phases, average particle diameters, surface qualities after machining, etching rates and chipping resistances in the same manner as Example 1. The results were as shown in Table 3.

TABLE 3

| Sample No. | Composition (% by weight) | | | Amount of grain boundary phase (wt %) | Average particle diameter (μm) | | | | Machining rate (Å/min) | Surface quality (μm) | Chipping resistance |
|---|---|---|---|---|---|---|---|---|---|---|---|
| | $Al_2O_3$ | TiC | MgO | | $Al_2O_3$ | TiC | $Al_2O_3$/TiC | whole | | | |
| 20 | 69.0 | 30 | 1.0 | 1.8 | 0.80 | 0.66 | 1.23 | 0.77 | 144 | 0.41 | good |
| 21 | 69.3 | 30 | 0.7 | 1.3 | 0.79 | 0.67 | 1.16 | 0.74 | 143 | 0.35 | good |
| 22 | 69.5 | 30 | 0.5 | 0.9 | 0.77 | 0.65 | 1.18 | 0.74 | 142 | 0.29 | good |
| 23 | 69.9 | 30 | 0.1 | 0.3 | 0.75 | 0.64 | 1.17 | 0.72 | 142 | 0.25 | good |

Samples marked with * lie outside the scope of the invention.

According to Table 3, the surface quality decreases with an increase in the amount of assistants. The samples Nos. 20 and 21 which contain grain boundary phases in amounts of larger than 1.0% by weight exhibit slightly deteriorated surface qualities. However, the products containing grain boundary phases in amounts of not larger than 1.0% by weight exhibit improved surface qualities. Among them, and by taking the results of Examples 1 and 2 into consideration, the product containing grain boundary phases in amounts of not larger than 0.3% by weight exhibits excellent surface quality, i.e., exhibits surface coarseness of not larger than 0.25 μm.

We claim:
1. An $Al_2O_3$-TiC sintered product, comprising:
   $Al_2O_3$ as a main component in the form of a plurality of $Al_2O_3$ particles, and
   TiC in an amount of from 20 to 40% by weight in the form of a plurality of TiC particles,
   the $Al_2O_3$ particles defining a first average particle diameter,
   the TiC particles defining a second average particle diameter,
   the $Al_2O_3$ particles and the TiC particles together defining a third average particle diameter,
   the first average particle diameter being larger than the second average particle diameter by 5 to 50%,
   the second average particle diameter being not larger than 0.9 μm,
   the third average particle diameter being not larger than 1 μm,
   the product defining at least one surface machined by ion irradiation and having a surface coarseness (Rmax) not larger than 0.3 μm.
2. The product of claim 1, comprising a grain boundary phase in an amount of not greater than 1.0% by weight.
3. The product of claim 1, wherein the sintered product is configured for use as a substrate for magnetic heads.
4. The product of claim 3, wherein the product defines at least one surface configured for facing a magnetic recording surface.
5. A substrate for magnetic heads, which comprises the $Al_2O_3$-TiC sintered product of claim 1.
6. A substrate for magnetic heads according to claim 5, wherein said substrate has a portion machined by being irradiated with ion-beam on the surface thereof that faces the magnetic recording surface.

* * * * *